US012067994B2

(12) United States Patent
Faubel et al.

(10) Patent No.: US 12,067,994 B2
(45) Date of Patent: Aug. 20, 2024

(54) TAMPER-ROBUST WATERMARKING OF SPEECH SIGNALS

(71) Applicant: CERENCE OPERATING COMPANY, Burlington, MA (US)

(72) Inventors: Friedrich Faubel, Ulm (DE); Jonas Jungclaussen, Ulm (DE); Marcus Groeber, Ulm (DE); Holger Quast, Ulm (DE); Oliver Van Porten, Ulm (DE); Markus Funk, Ulm (DE)

(73) Assignee: CERENCE OPERATING COMPANY, Burlington, MA (US)

( * ) Notice: Subject to any disclaimer, the term of this patent is extended or adjusted under 35 U.S.C. 154(b) by 0 days.

(21) Appl. No.: 17/874,788

(22) Filed: Jul. 27, 2022

(65) Prior Publication Data

US 2024/0038249 A1 Feb. 1, 2024

(51) Int. Cl.
*G10L 19/018* (2013.01)
*G10L 21/14* (2013.01)

(52) U.S. Cl.
CPC ............ *G10L 19/018* (2013.01); *G10L 21/14* (2013.01)

(58) Field of Classification Search
CPC .............................. G10L 19/018; G10L 21/14
See application file for complete search history.

(56) References Cited

U.S. PATENT DOCUMENTS

2001/0049788 A1* 12/2001 Shur ..................... G06T 1/0028 375/E7.206
2004/0139324 A1* 7/2004 Shin ...................... H04L 9/3236 380/252
2005/0033579 A1* 2/2005 Bocko ................... G10L 19/018 704/E19.009
2006/0007995 A1* 1/2006 Yeon ..................... G10L 19/018 704/E19.009
2009/0076826 A1* 3/2009 Voessing ............... G10L 19/018 704/E21.001
2010/0057231 A1* 3/2010 Slater .................... G10L 19/018 700/94
2013/0073065 A1* 3/2013 Chen ..................... G10L 19/018 700/94
2014/0129011 A1* 5/2014 Radhakrishnan ..... G10L 19/018 700/94

(Continued)

FOREIGN PATENT DOCUMENTS

AU 2004235685 A1 1/2005
EP 2362385 A1 8/2011

OTHER PUBLICATIONS

He, Xing, A. I. Illiev, and Michael S. Scordilis. "A high capacity watermarking technique for stereo audio." 2004 IEEE International Conference on Acoustics, Speech, and Signal Processing. vol. 5. IEEE, 2004. (Year: 2004).*

(Continued)

*Primary Examiner* — Brian L Albertalli
(74) *Attorney, Agent, or Firm* — Brooks Kushman, P.C.

(57) ABSTRACT

A method for applying a watermark signal to a speech signal to prevent unauthorized use of speech signals, the method may include receiving an original speech signal; determining a corresponding spectrogram of the original speech signal; selecting a phase sequence of fixed frame length and uniform distribution; and generating an encoded watermark signal based on the corresponding spectrogram and phase sequence.

17 Claims, 5 Drawing Sheets

(56) References Cited

U.S. PATENT DOCUMENTS

| | | | | |
|---|---|---|---|---|
| 2015/0340045 | A1* | 11/2015 | Hardwick | G10L 19/018 704/205 |
| 2018/0146370 | A1* | 5/2018 | Krishnaswamy | G10L 19/018 |
| 2019/0013033 | A1* | 1/2019 | Bhimanaik | G10L 19/018 |
| 2019/0385623 | A1* | 12/2019 | Huber | G10L 17/02 |
| 2020/0211549 | A1* | 7/2020 | Yamagishi | G06N 5/043 |
| 2020/0372922 | A1* | 11/2020 | Garcia | G10L 15/22 |
| 2021/0050024 | A1 | 2/2021 | Wouters et al. | |
| 2021/0183399 | A1* | 6/2021 | Christian | H04N 21/233 |

OTHER PUBLICATIONS

Shokri, Shervin, Mahamod Ismail, and Nasharuddin Zainal. "Voice quality in speech watermarking using spread spectrum technique." 2012 international conference on Computer and Communication Engineering (ICCCE). IEEE, 2012. (Year: 2012).*

Arnold, Michael, et al. "A phase-based audio watermarking system robust to acoustic path propagation." IEEE Transactions on Information Forensics and Security 9.3 (2013): 411-425. (Year: 2013).*

Kirovski D et al., "Robust spread-spectrum audio watermarking", IEEE International Conference on Acoustics, Speech, and Signal Processing (ICASSP), New York, NY: IEEE, US vol. 3, May 7, 2001, pp. 1345-1348.

* cited by examiner

TAMPER-ROBUST WATERMARKING OF SPEECH SIGNALS

FIELD OF INVENTION

Described herein are mechanisms for watermarking of speech signals.

BACKGROUND

Many systems and applications are speech enabled, allowing users to interact with the system via speech. Speech is sometimes used to authenticate users via voice biometrics, phrases, etc. However, with developments in text-to-speech (TTS) technologies, synthetic speech is becoming difficult to detect. In order to prevent unauthorized copying of speech signals or the use of synthetic speech signals, the speech signals may be encoded with certain watermarking. Current watermarking techniques may not ensure appropriate authentication of speech signals, or the quality of the audio signal may suffer.

SUMMARY

A method for applying a watermark signal to a speech signal to prevent unauthorized use of speech signals, the method may include receiving an original speech signal; determining a corresponding spectrogram of the original speech signal; selecting a phase sequence of fixed frame length and uniform distribution; and generating an encoded watermark signal based on the corresponding spectrogram and phase sequence.

In a further embodiment, the method includes taking the magnitude of the original speech spectrogram to generate the encoded watermark.

In another embodiment, the spectrogram is determined by applying a short-time Fourier transform (STFT) to determine the sinusoidal frequency and phase content of each frame of the original input signal.

In a further embodiment, the method includes applying bit encoding prior to generating the encoded watermark.

In another embodiment, the bit encoding includes assigning bits based on information about the original speech signal.

In a further embodiment, the bit encoding is spread out through a subset of frequency bins to allow for detection of the bit encoding in adverse conditions.

In another embodiment, the method includes comprising determining a frequency dependent gain factor based at least in part on a frequency of the original speech signal.

In a further embodiment, the frequency dependent gain factor is based on at least one frequency threshold, where a first gain factor is selected for frequencies below a first threshold frequency, and where a second gain factor is selected for frequencies above a second threshold frequency.

In another embodiment, a transition gain factor is selected for frequencies between the first threshold frequency and the second threshold frequency.

In a further embodiment, the method includes storing the encoded watermark for authenticating a future speech signal, the encoded watermark defining permissions for use of the future speech signal.

In another embodiment, the method includes adding at least one of a pretty good privacy (PGP) or public key cryptography to the watermark signal.

In a further embodiment, the watermark signal includes words spoken in the original speech signal, wherein each word is associated with a sequence position.

In another embodiment, the watermark signal includes a start and end time for each word as spoken in the original speech signal.

A non-transitory computer readable medium comprising instructions for applying a watermark signal to a speech signal to prevent unauthorized use of speech signals that, when executed by a processor, causes the processor to perform operations may include to receive an original speech signal; determine a corresponding spectrogram of the original speech signal; select a phase sequence of fixed frame length and uniform distribution; generate an encoded watermark signal based on the corresponding spectrogram and phase sequence.

In another embodiment, the processor is programmed to perform operations further comprising to take the magnitude of the spectrogram to generate the encoded watermark.

In a further embodiment, the spectrogram is determined by applying a short-time Fourier transform (STFT) to determine the sinusoidal frequency and phase content of each frame of the original input signal.

In another embodiment, the processor is programmed to perform operations further comprising to apply bit encoding prior to generating the encoded watermark.

In a further embodiment, the bit encoding includes assigning bits based on information about the original speech signal.

A method for applying a watermark signal to an audio signal including speech content to prevent unauthorized use of the speech content, the method may include receiving an original audio signal having speech content; generating an encoded watermark signal based on the original speech signal, the encoded watermark signal defining allowed usage of the original audio signal; and transmitting an encoded audio signal including the original audio signal and watermark signal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
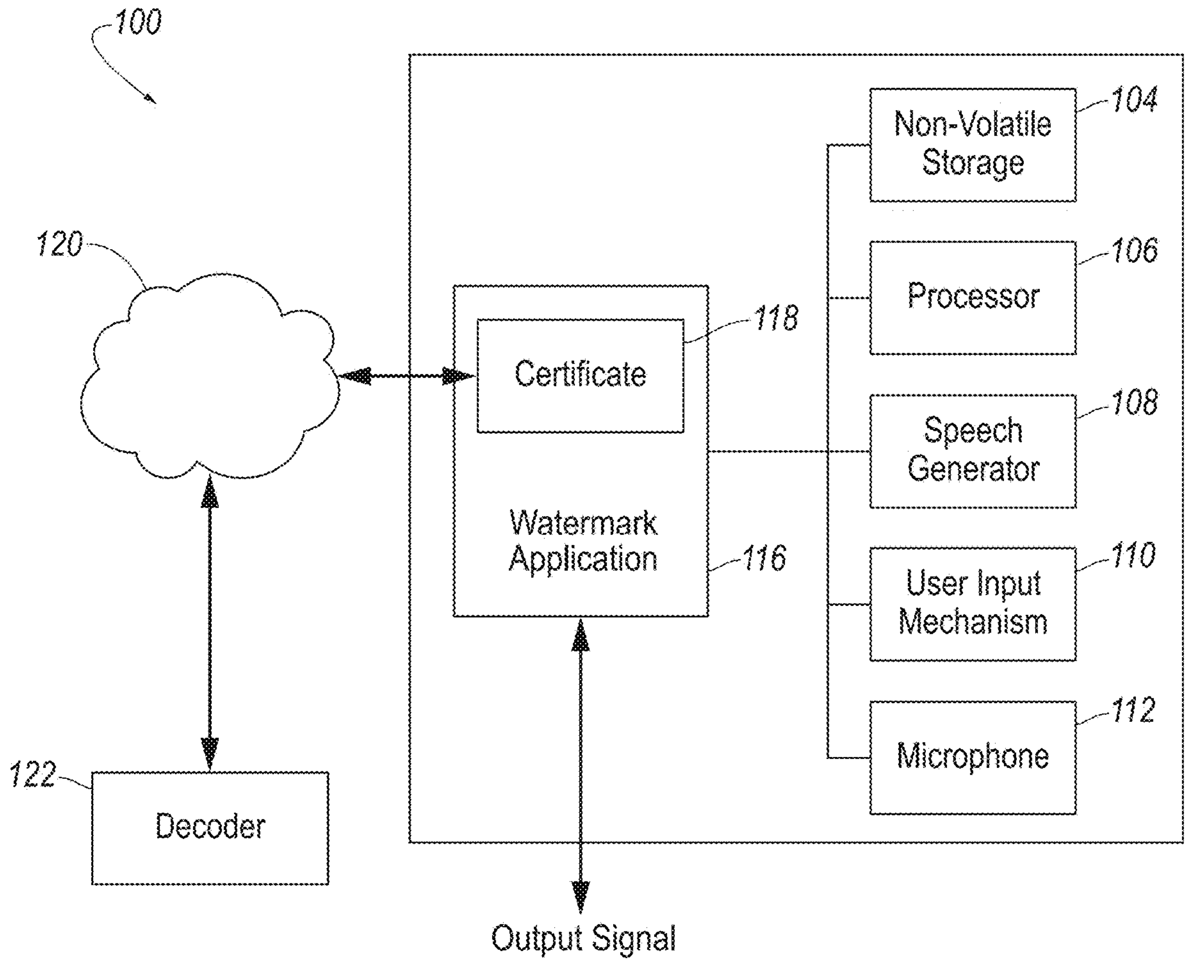
FIG. 1 illustrates a block diagram for a voice watermarking system in accordance with one embodiment.

With the increased quality of text-to-speech technology, voice avatars could be used to trick a voice-biometric based security mechanism, or to send messages in the name of someone else. In order to prevent this, speech signals can be encoded with a watermark that contains extra information, for instance, whether the speech originates from a real person or a cloned voice, the native language of the voice's speaker, gender, and so forth. The watermark is mostly inaudible so that the speech quality is not reduced.

On the receiving side, a decoder may detect the watermark and read out the information within the watermark. The decoder may, for example, be used for authenticating the voice in a speech signal for voice biometrics or messaging and communication applications. The watermark may be a pseudo-random watermark sequence added to the speech signal in the frequency domain. The magnitude may be controlled by the magnitude of the speech signal. Because of this, the watermark is concentrated at those locations in the spectrum where a modification of the speech signal would probably be audible. This allows the watermark system to thwart off attacks such as including noise in the signal or encoding the signal with a lossy audio codec.

Further, adding the watermark in the frequency domain also allows for sending different parts of the information contained in the watermark in different frequency bands, or duplicate the watermark's information across multiple frequency bands to make it harder to tamper with the watermark.

Splicing attacks may be attempted when an unauthorized user may cut certain words or phrases from a speech signal and rearrange the splices to create a new audio message out of the various clips. The watermark may contain the words of the audio message in text form, in their order in the utterance. For each word token in this string the watermark may furthermore contain information about the sentence position where each word was spoken—as token number and/or by indicating start and end time for each word in the sentence. Because the watermark is still present in each clip, the watermark may prevent the unauthorized splicing, preventing splicing attacks. Additionally or alternatively, a counter may be added to the encoded information that regularly increases in a given time interval to further make copying or splicing detectable.

The watermark may include information about the speaker ID, speaking situation, allowed usage, and/or authentication certificate or token, such as pretty good privacy (PGP), public key cryptography, etc. The certification process may thus work in two parts, the voice signal authentication token may only be used by an authorized identity to create a certified voice sample, and people who have been given access to receive and listen to the voice signal may authenticate it per the—possibly encrypted—certificate that is part of the watermark and an additional security token such as a public key.

The voice usage certificate or watermark may contain information about the allowed use of the voice. For example, the voice owner may specify that the voice may only be used for reading out messages that he sends, but not as a voice for a generic voice assistant. The watermark may also specify whether the speaker's artificial voice may be used to read out profanity or not and have an explicit list of blacklisted words that may not be spoken by the voice.

In another and specific example of the necessity to watermark signals, a world leader may present a speech and instructs the military to protect a refugee corridor. The world leader may add a watermark to the audio and/or video to authorize this audio stream/recording. When a receiver, which may be a private viewer, government official, foreign statesperson, military officer, or a news agency, receives the content, they run the authentication process to see that the audio is legit. On the other hand, if evil propaganda machinery produces a fake recording with the leader's voice saying he doesn't really care and just wants to play golf, it will not carry that authentication token and can therefore not be assumed to be real.

Accordingly, a watermarking system is described herein with the ability to be inaudible for speech signals, while also being robustly secure against various avenues of attack.

FIG. 1 illustrates a block diagram for a voice watermarking system 100 in accordance with one embodiment. The voice watermarking system 100 may be designed for any system for generating an audio watermark embedding in a human or synthetic speech. In one example, the synthetic speech may be generated using text-to-speech (TTS) synthesis. The watermarking system 100 may be implemented to prevent high quality TTS voice avatars from spoofing voice biometrics to impersonate a human voice.

The watermarking system 100 may be described herein as being specific to human speech signals, but may generally be applied to other types of audio signals, such as music, signing, etc. In some examples, the watermarking system 100 may be applicable within vehicles, as well as other systems to verify speech signals prior to granting access to or generating TTS voice signals. In other examples, the system 100 may be applied to video content as well.

The watermarking system 100 may include a processor 106. The processor 106 may execute instructions for certain applications, including a watermark application 116. Instructions for the watermark application 116 may be maintained in a non-volatile manner using a variety of types of computer-readable storage medium 104. The computer-readable storage medium 104 (also referred to herein as memory 104, or storage) includes any non-transitory medium (e.g., a tangible medium) that participates in providing instructions or other data that may be read by the processor 106. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/structured query language (SQL).

The watermarking system 100 may include a speech generator 108. The speech generator 108 may generate synthetic speech signals such as voice avatars based on previously acquired human speech signals. The speech generator 108 may use TTS systems, as well as other types of speech generators. The speech generator 108 may use voice transformation techniques, including spectral mapping to match certain target voices.

The watermarking system may include at least one microphone 112 configured to receive audio signals from a user, such as acoustic utterances including spoken words, phrases, passwords, or commands from a user. In the example where the system is within a vehicle, the microphone 112 may be used for other vehicle features such as active noise cancelation, hands-free interfaces, wake up word detection, etc. The microphone 112 may facilitate speech recognition from audio received via the microphone 112 according to grammar associated with available commands, and voice prompt generation. The microphone 112 may, in some implementations, include a plurality of sound capture elements, e.g., to facilitate beamforming or other directional techniques.

A user input mechanism 110 may be included, in that a voice owner or user may utilize the user input mechanism 110 to enter preferences associated with the watermarking system 100. An authenticated user may be an individual who is permitted to use the voice of the voice owner to read out messages or one who is permitted to receive the voice message, etc. The voice owner or user may be the originator (i.e., the person speaking in the recording or the person whose voice clone was created.) That is, the voice owner or user may have the ability to enter allowed usage of the user's voice. For example, the user may allow the voice to be used for reading out messages, but not as voice for a generic voice assistant, or to be used for biometric authentication. Other settings, such as allowing the voice to read out profanity, or adding blacklisted words to a list of words to prevented to be spoken. These user preferences may be used to generate the watermark, as described in more detail herein. Further, in some examples, the watermark may contain the words of the audio message in text form, in their order in the utterance. For each word token in this string the watermark may furthermore contain information about the sentence position where each word was spoken—as token number and/or by indicating start and end time for each word in the sentence.

The user input mechanism 110 may include a visual interface, such as a display on a user mobile device, computer, vehicle display, etc. The user input mechanism 110 may facilitate user input via a specific application that provides a user friendly interface allowing for selectable options, or customizable features. The user input mechanism 110 may also include an audio interface, such as a microphone capable of audibly receiving commands related to permissions and preferences for voice usage.

The watermark application 116 is configured to receive speech signal information or data from the memory 104, processor 106, speech generator 108, user input mechanism 110 and/or microphone 112 and generate a watermark to be added to a speech signal. The speech signal may be provided by the speech generator 108 or the microphones 112. The watermark application 116 is configured to generate and embed an audio watermark signal into the speech signal and output an output signal. The output signal may include the speech signal and the watermark, though the watermark is imperceptible to the human ear and does not degrade the speech signal. Moreover, it is designed such that it cannot be removed easily from the speech signal without destroying or at least seriously degrading it, such that use of the voice for unauthorized purposes can be detected or prevented by not allowing playback by the audio hardware/software. The output signal may be transmitted via a speaker (not shown), or may be recorded or saved for later use.

The watermark application may generate and maintain a watermark certificate 118 associated with the speech signal. The certificate 118 may be (or may otherwise include) the generated watermark. The watermark certificate 118 may be maintained separate from the output signal into which the watermark is embedded and may be used by a third party to determine whether a speech signal is authorized or not. That is, a recipient that is in possession of the certificate 118 may utilize the certificate 118 to determine whether a speech signal is genuine or unaltered, or whether it has been copied, reproduced, spliced, etc. In an example, the recipient may compare a digital footprint of the speech signal with the watermark certificate 118. Only authorized third parties may receive the certificate 118.

The certificate 118 may be generated based on the speech signal, including the magnitude of the speech signal, phase information, gain factors, user preferences, etc. That is, the certificate, or watermark, may be specific to each speech signal. This may allow for a higher degree of security as well as a better speech signal audio that is undisturbed by the addition of the watermark.

The watermark application 116, via the processor 106, or other specific processor, may transmit the certificate to a third party decoder 122. This may be achieved via a communication network 120. The communication network 120 may be referred to as a "cloud" and may involve data transfer via wide area and/or local area networks, such as the Internet, cellular networks, Wi-Fi, Bluetooth, etc. The communication network 120 may provide for communication between the watermark application 116 and the third party decoder 122. Further, the communication network 120 may also be a storage mechanism or database, in addition to the cloud, hard drives, flash memory, etc. The third party decoder 122 may be implemented on a remote server or otherwise external to the watermark application 116. While one decoder 122 is illustrated, more or fewer decoders 122 may be included, and the user may decide to send the certificate 118 to more than one third party, allowing more than one third party to authenticate speech signals based on the watermark. The third parties may also receive the watermark certificate 118 and decode the certificate 118 to denote user preferences for the use of the user's speech signal.

The watermarking system 100, including the processor 106, watermark application, 116, decoder 112, as well as other components, may include one or more computer hardware processors coupled to one or more computer storage devices for performing steps of one or more methods as described herein and may enable the watermark application 116 to communicate and exchange information and data with systems and subsystems external to the application 116 and local to or onboard the vehicle application. The system 100 may include one or more processors 106 configured to perform certain instructions, commands and other routines as described herein.

As explained, while automotive systems may be discussed in detail here, other applications may be appreciated. For example, similar functionality may also be applied to other, non-automotive cases. In one example, the functionality may be used for the verification of speech input to a smart speaker device. In another example, the functionality may be used for input to a smartphone. In yet another example, the functionally may be used for verification of speech input to a security system.

Figure 2A:
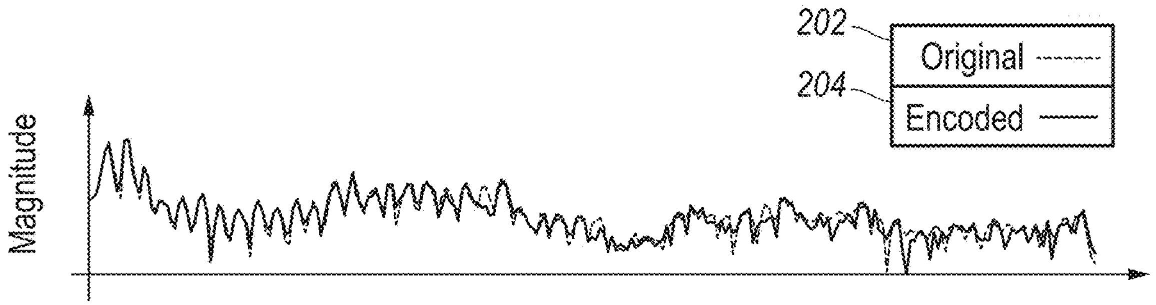
FIG. 2A illustrates an example chart of the magnitude of an original speech signal and an encoded watermark signal versus frequency.

FIG. 2A illustrates an example chart of the magnitude of an original speech signal 202 and an encoded watermark signal 204 versus frequency. The Y-Axis shows signal magnitude, while the X-Axis indicates time. As illustrated, the encoded watermark signal 204 substitutes a small portion of the original speech signal 202. This may be observed by slight nonoverlapping magnitude of the encoded watermark signal 204 as compared to the original speech signal 202.

Figure 2B:
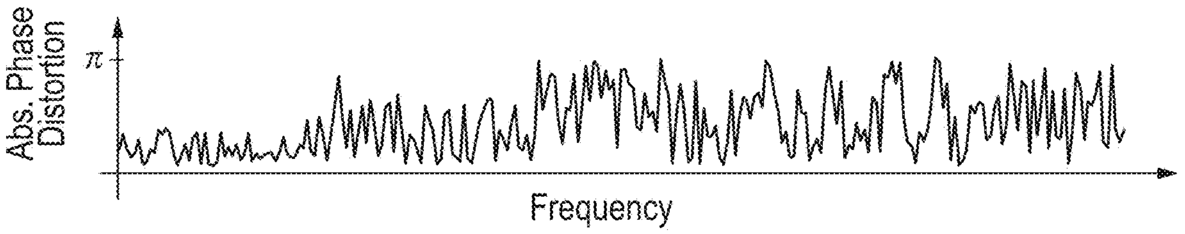
FIG. 2B illustrates an example chart of the absolute phase distortion of the original speech signal.

FIG. 2B illustrates an example chart of the absolute phase distortion of the original speech signal. The Y-Axis shows absolute phase distortion, while the X-Axis indicates frequency. The watermark spectrum used in the substitution of FIG. 2A is a scaled-down version of the original speech spectrum in which the phase information is completely replaced by a pseudo-random sequence. This creates an inaudible distortion of the speech signal, where the distortion mostly affects signal phase. The absolute phase distortion may be detected robustly.

Figure 3:
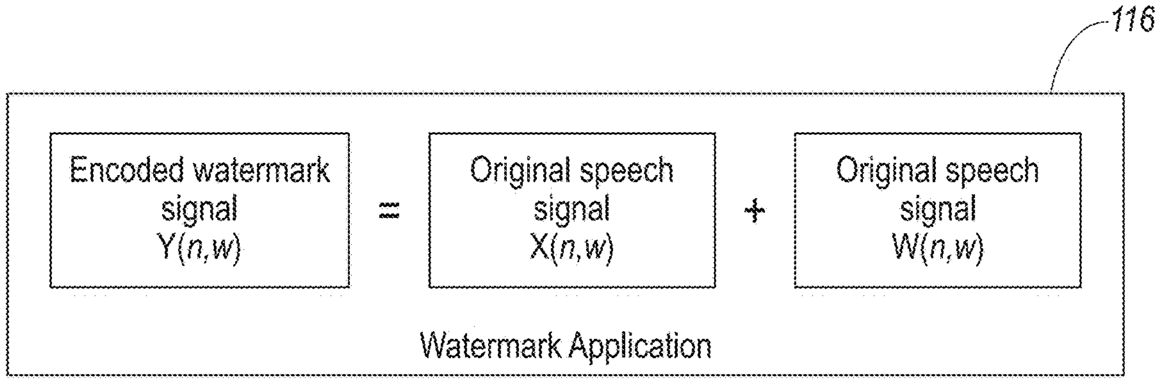
FIG. 3 illustrates a block diagram of the watermark application of FIG. 1.

FIG. 3 illustrates a block diagram of the watermark application 116 of FIG. 1. The watermark application 116 may generate an output spectrogram Y(n,ω) by adding a watermark sequence or encoded watermark spectrogram $\mathcal{W}$(n,ω) to the original speech spectrogram X(n,ω). Here n denotes the fram index and w denotes frequency. The watermark application 116 may receive an x(t) original speech signal from the speech generator 108 or microphone 112 (as illustrated in FIG. 1). The original speech signal is the signal to which the watermark is to be added. The watermark application 116 may take the corresponding spectrogram X(n,ω) of the original speech signal by applying a Fourier transform by cutting the original speech signal x(t) into overlapping frames and performing Fourier transforms on each frame. The Fourier transform, in one example, may be a short-time Fourier transform (STFT) to determine the sinusoidal frequency and phase content of each frame or section. In the corresponding spectrogram X(n,ω), n denotes the frame index (n=1, 2, 3 . . . ) and ω denotes frequency.

The watermark application 116 may determine a phase sequence θ(m,ω), where m=1, . . . T. The phase sequence θ(m,ω) is a multi-frame random sequence of fixed frame length T with uniform distribution in [0, . . . 27π]. This sequence is chosen once by the watermark application and kept secret. The sequence may be randomly selected from a library of possible sequences, or may be randomly generated for each watermark.

The watermark application 116 may generate the $\mathcal{W}$(n, ω), n=1,2,3, . . . obtained from the magnitude of the corresponding spectrogram X(n,ω) of the original speech signal and the phase sequence θ(m,ω), according to:

$$\mathcal{W}(n,\omega)=|X(n,\omega)|\cdot\exp(i\theta(\mathrm{mod}(n,T),\omega)),$$

where mod is the modulus operator, i.e. the remainder during division of n by T.

For a high robustness watermark, the magnitude of the watermark spectrum should be as high as possible, but should also stay below the level where it becomes audible. Thus, a lower watermark magnitude may be used in lower frequencies of the original speech signal where the human hearing system is more sensitive to phase distortions.

While not expressly shown, it should be noted that the watermark may use/contain? an additional authentication certificate or token, such as pretty good privacy (PGP), public key cryptography, etc.

Figure 4:
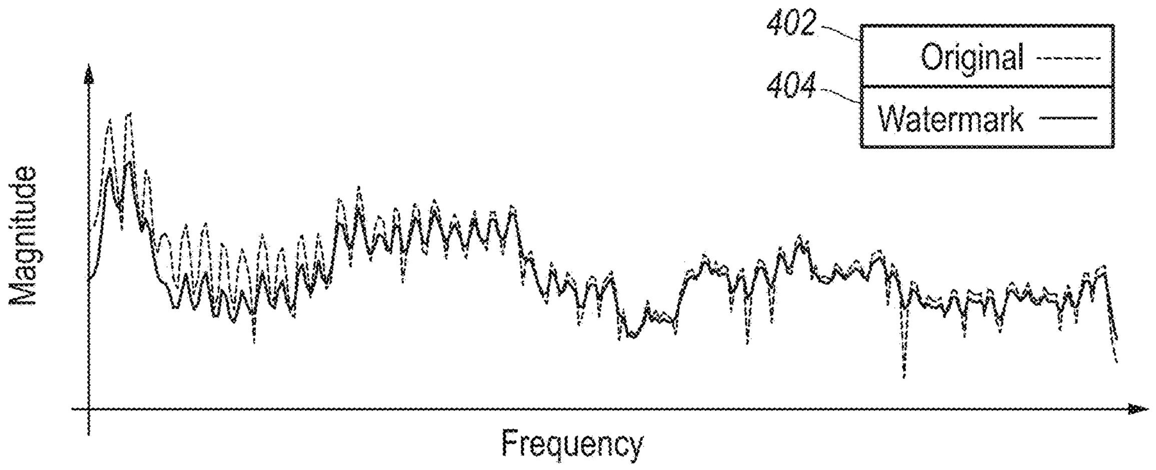
FIG. 4 illustrates an example chart of the magnitude of an original speech signal and an encoded watermark signal versus frequency.

FIG. 4 illustrates an example chart of the magnitude of an original speech spectrum 402 and an encoded watermark signal 404 versus frequency. Specifically, the Y-Axis shows spectral magnitude, while the X-Axis indicates frequency. As illustrated, as the magnitude of the original speech spectrum 402 decreases, as does the magnitude of the encoded watermark signal 404. Moreover, the difference in magnitude between the original speech spectrum and watermark is bigger in lower frequency but decreasing towards higher ones. This allows for an undistorted encoded output signal. In order to generate the watermark signal 404, a frequency dependent gain factor α(ω) may be used, such that:

$$Y(n,\omega)=X(n,\omega)+\alpha(\omega)\cdot\mathcal{W}(n,\omega),$$

where α(ω) may be a curve that is 0.1 (corresponding to an attenuation of −20 dB) for frequencies<1000 Hz, and where α(ω) may be a curve that is 0.5 (corresponding to an attenuation of −5 dB) for frequencies>3000 Hz, with a transition in the dB scale in between.

For example:

$$\alpha(\omega)=\begin{cases} pow\left(10,-\frac{20}{20}\right), & \omega<1000\,\mathrm{Hz} \\ pow\left(10,-\frac{20}{20}\cdot\left(1-\frac{\omega-1000}{2000}\right)-\frac{6}{20}\cdot\frac{\omega-1000}{2000}\right), & 1000\,\mathrm{Hz}\le\omega\le 3000\,\mathrm{Hz} \\ pow\left(10,-\frac{6}{20}\right), & \omega>3000\,\mathrm{Hz} \end{cases}$$

That is, the gain factor may vary based on the frequency, where a first gain factor may be used for frequencies below a first threshold frequency, and where a second gain factor may be used for frequency above a second threshold frequency. A transition gain factor may be used for frequencies between the first threshold frequency and the second threshold frequency.

Thus, the frequency dependent gain factor α(ω) may be used to generate the watermark signal and may be based on the frequency to create a watermark spectrum that is as high as possible, but still stays below the audible level.

Figure 5:
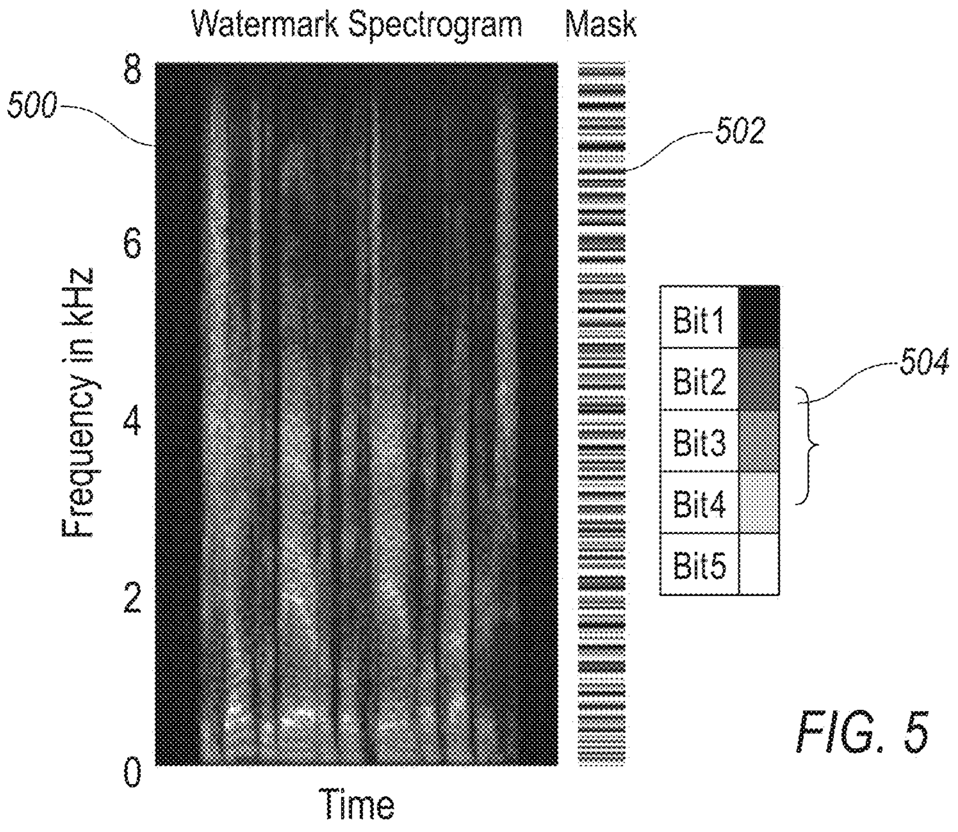
FIG. 5 illustrates an example watermark spectrum illustrating frequency over time.

FIG. 5 illustrates an example watermark spectrum 500 illustrating frequency over time. A corresponding mask 502 is also illustrated to show the additional encoding for each frequency. Further, a bit encoding 504 is illustrated. Bit encoding 504 may be used to further encode the watermark signal as well as provide information about the speech signal. This may be achieved by using a 5 bit, or more, encoding, where each bit is encoded into a unique, spread-out subset of frequency bins. This may allow for detection in adverse conditions, such as noisy signals, etc. The bit-to-frequency assignment is illustrated in FIG. 5. For example, 1 bit may be used for indicating that the recording is watermarked, while 2 bits may be used for the voice type. The voice type may include an identifier such as a real voice, cloned voice, stacked voice, etc. the two remaining bits may be used for the voice name. These bits can be increased if desired.

Each bit may be encoded by shifting the watermark phase by π for b=1 and using the original watermark phase for b=0. That is, the bits are represented and detected via phase shifting and if needed, translated into the bit assignments for decoding. For example:

$$\mathcal{W}(n,\omega,b)=\begin{cases} |X(n,\omega)|\cdot\exp(i\theta(\mathrm{mod}(n,T),\omega)), & b=0 \\ |X(n,\omega)|\cdot\exp(i\theta(\mathrm{mod}(n,T),\omega)+i\pi), & b=1 \end{cases}$$

This bit encoding may allow for cryptographic enhancement to be integrate, for example, by scrambling bits or by scrambling the frequency assignment as described below. Scrambling in this context could include choosing different frequency permutations for each entire encoding run, for each frame, or for a fixed number of frames.

The above bit assignments may be generalized by not just considering phase shifts of 0 and pi, but also having a quantization to e.g. pi/4 in the event eight bits are encoded instead of two and values per frequency omega (i.e. 3 bits instead of 1). This shows resemblance to a modulation technique called "phase shift keying" (PSK). The equation shown above for encoding 1 bit is related to binary PSK.

Frequencies may be grouped into separate frequency subsets $\Omega_1$, $\Omega_2$, $\Omega_3$, $\Omega_4$, each associated with the respective bit b, e.g., $b_1$ is encoded into the frequencies contained in $\Omega_1$, $b_2$ is encoded into the frequencies contained in $\Omega_2$, and so on. For example:

$$\mathcal{W}(n,\omega,b)=\begin{cases}\mathcal{W}(n,\omega,b_1), & \omega\in\Omega_1\\ \mathcal{W}(n,\omega,b_2), & \omega\in\Omega_2\\ \mathcal{W}(n,\omega,b_3), & \omega\in\Omega_3\\ \mathcal{W}(n,\omega,b_4), & \omega\in\Omega_4\end{cases}$$

This may allow for a more robust bit detectability during decoding, while allowing for several bits $b=(b_1, b_2, b_3, b_4)$ to be encoded into one frame. As shown in FIG. 5, the frequency subsets are chosen such that bits are widely spread throughout the entire spectrum. This allows for the encoding to be inaudible and highly robust.

Figure 6:
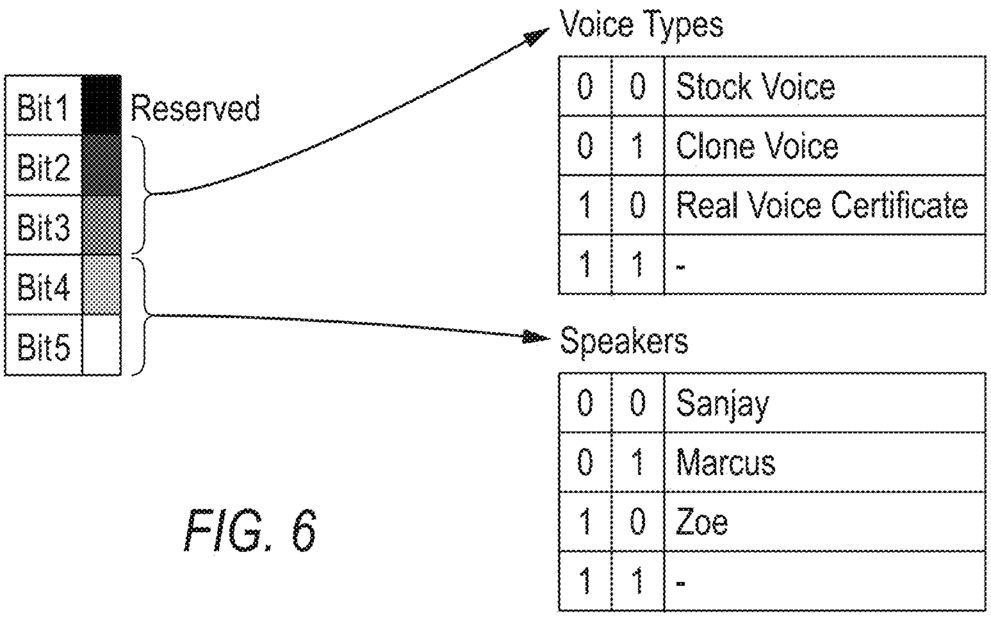
FIG. 6 illustrates an example bit assignment for the encoding of FIG. 5.

FIG. 6 illustrates an example bit assignment for the encoding of FIG. 5. In this example, bit 1 may be reserved. As explained above, this bit may be indicating that the recording is watermarked. Hence, this bit may be used for watermark detection. Bits 2 and 3 may indicate the voice type. For example, a "00" bit assignment may indicate a stock voice, a "01" bit assignment may indicate a clone voice, and a "10" bit assignment may indicate a real voice certificate. These assignments and indicators are merely examples and other factors, parameters, or information may be represented by these bits. Other voice types may also be identified.

In the example shown in FIG. 6, bits 4 and 5 may indicate a specific human speaker. For example, the bit assignments may indicate the name of a speaker. This may include a public figure, famous persona, etc. While five bits are shown, an extension of more bits may be easily achieved by encoding the information across multiple time frames.

Referring back to FIG. 1, once the encoded watermark signal is determined, the signal may be added to the original speech signal to generate the output. The various watermark certificates 118 may be stored in the watermark application 116 and applied to the original speech signal and then transmitted to the appropriate decoder 122 as necessary. Various certificates 118 may be used, including single certificates, more than one certificate, etc. The certificate 118 may be known to both the user or generator of the output signal, as well as the authenticator or decoder in order to ensure that a reproduced speech signal is authentic or within the permissions granted by the user. Specifically, the decoder 122 may be a computer or processor capable of receiving both an audio signal and the certificate 118. The decoder 122 may determine whether the audio signal includes an encoded watermark signal. This may be done by comparing the certificate 118 with the audio signal to see if the audio signal includes the certificate. If the decoder 122 determines that the encoded watermark signal is present in the audio signal, the decoder may authorize access to authenticate the audio signal based on the presence of the watermark signal. In the absence of a watermark signal, the decoder 122 may deny access or authentication and may transmit messages or instructions indicating the unauthorized use of the audio signal.

As explained above, audio signals may be used for voice biometric authentication, repeated or reading messages in a certain voice, etc. Such authentication and watermarking may be appreciated by public figures who speak in public often and are often recorded. Such watermarking may prevent the unauthorized copying, splicing, etc., of their respective voices.

In some examples, the watermark application 116 may transmit the certificate to the decoder 122 in parallel with generating the encoded watermark signal and output signal. In another example, the decoder 122 may request access for the certificate and then the watermark application 116 may transmit the certificate upon recognizing the decoder 122. In some instances, parts of the watermark signal may still remain secret to the decoder 122 or third parties.

Figure 7:
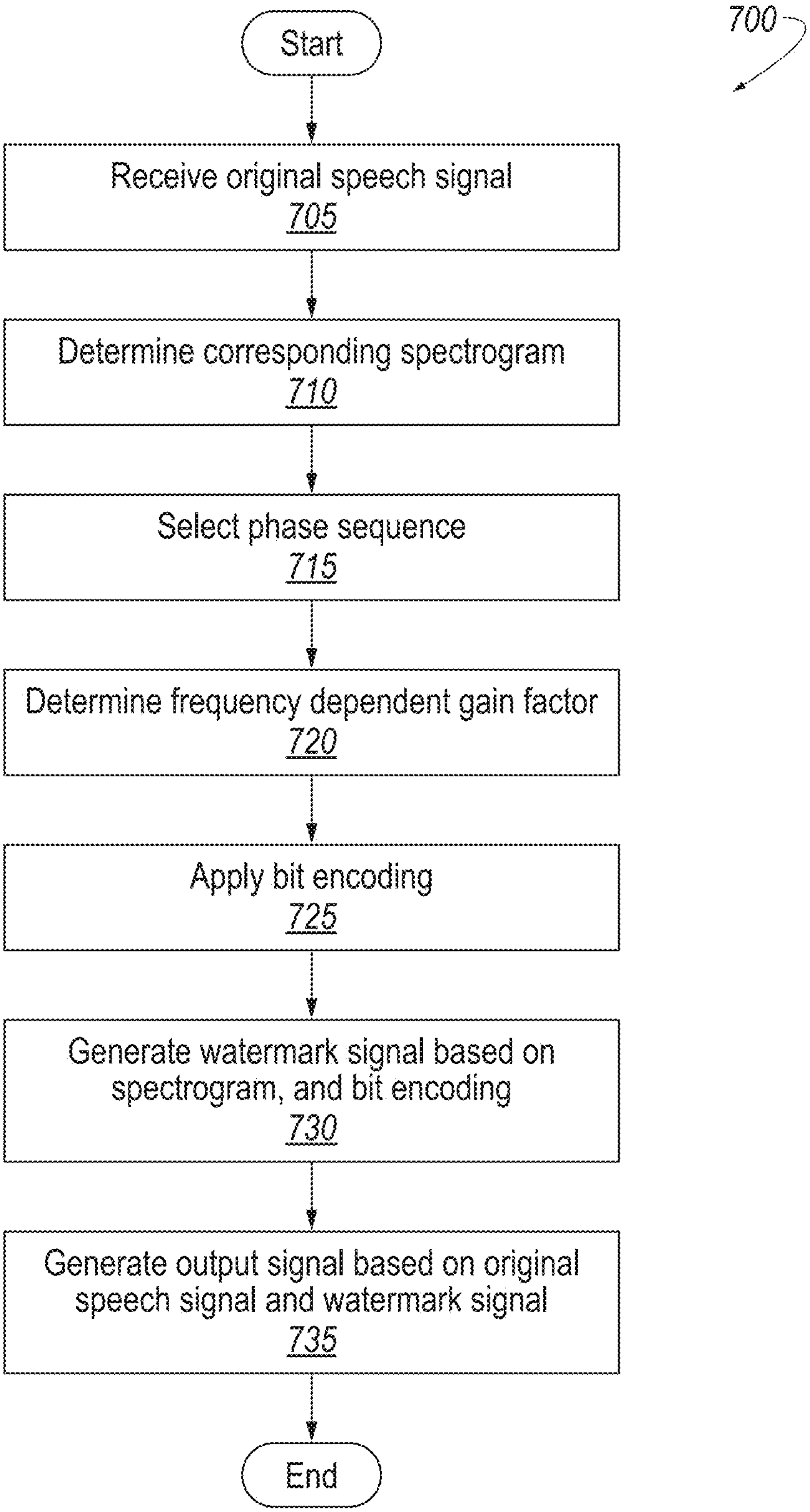
FIG. 7 illustrates an example process for the watermark system of FIG. 1.

FIG. 7 illustrates an example process 700 for the watermark system 100. The process 700 may begin at block 705 where the watermark application 116 receives the original speech signal x(t). As explained above, this may be human speech audio or synthetically generated speech from TTS.

At block 710, the watermark application 116 may determine a corresponding spectrogram X(n,ω)), based on the original speech signal x(t).

At block 715, the watermark application 116 may select the phase sequence θ(m,ω). Notably, the phase sequence may be kept as a secret.

At block 720, the watermark application 116 may determine the frequency-dependent gain factor α(ω), where α(ω) may be a curve that is 0.1 (corresponding to an attenuation of −20 dB) for frequencies w<1000 Hz and where α(ω) may be a curve that is 0.5 (corresponding to an attenuation of −5 dB) for frequencies>3000 Hz, with a transition in the attenuations therebetween.

At block 725, the watermark application 116 may apply bit encoding to indicate various properties about the speech signal, including voice type and voice name, for example. The bit encoding may be spread out over a subset of frequency bins to allow detection in adverse conditions. The bit encoding may be achieved by shifting the watermark phase by π for b=1 and using the original watermark phase for b=0:

$$\mathcal{W}(n,\omega,b)=\begin{cases}|X(n,\omega)|\cdot\exp(i\theta(\bmod(n,T),\omega)), & b=0\\ |X(n,\omega)|\cdot\exp(i\theta(\bmod(n,T),\omega)+i\pi), & b=1\end{cases}$$

At block 730, the watermark application 116 may generate the encoded watermark signal $\mathcal{W}$(n,ω,b) based on at least a subset of the spectrogram X(n,ω), phase sequence θ(m,ω), gain factors α(ω), and bit encoding. In one example, the watermark application may take the magnitude of the original speech signal X(n,ω) to generate the watermark signal. For example:

$$\mathcal{W}(n,\omega)=|X(n,\omega)|\cdot\exp(i\theta(\bmod(n,T),\omega))$$

In another example, as explained in block 725, bit encoding may also be used to generate the watermark signal $\mathcal{W}$(n,ω,b).

At block 735, the watermark application 116 may generate the output signal by applying the encoded watermark signal $\mathcal{W}$(n,ω,b) to the original speech signal X(n,ω)):

$$Y(n,\omega)=X(n,\omega)+\alpha(\omega)\cdot\mathcal{W}(n,\omega,b)$$

The process 700 may then end.

The process 700 may be carried out by the processor 106 or another processor specific or shared with the watermark application 116. The watermark signal may be generated based on one or more factors and signals, and may omit one of more of the bit encoding, gain factor, phase sequence, etc., as discussed above.

Figure 8:
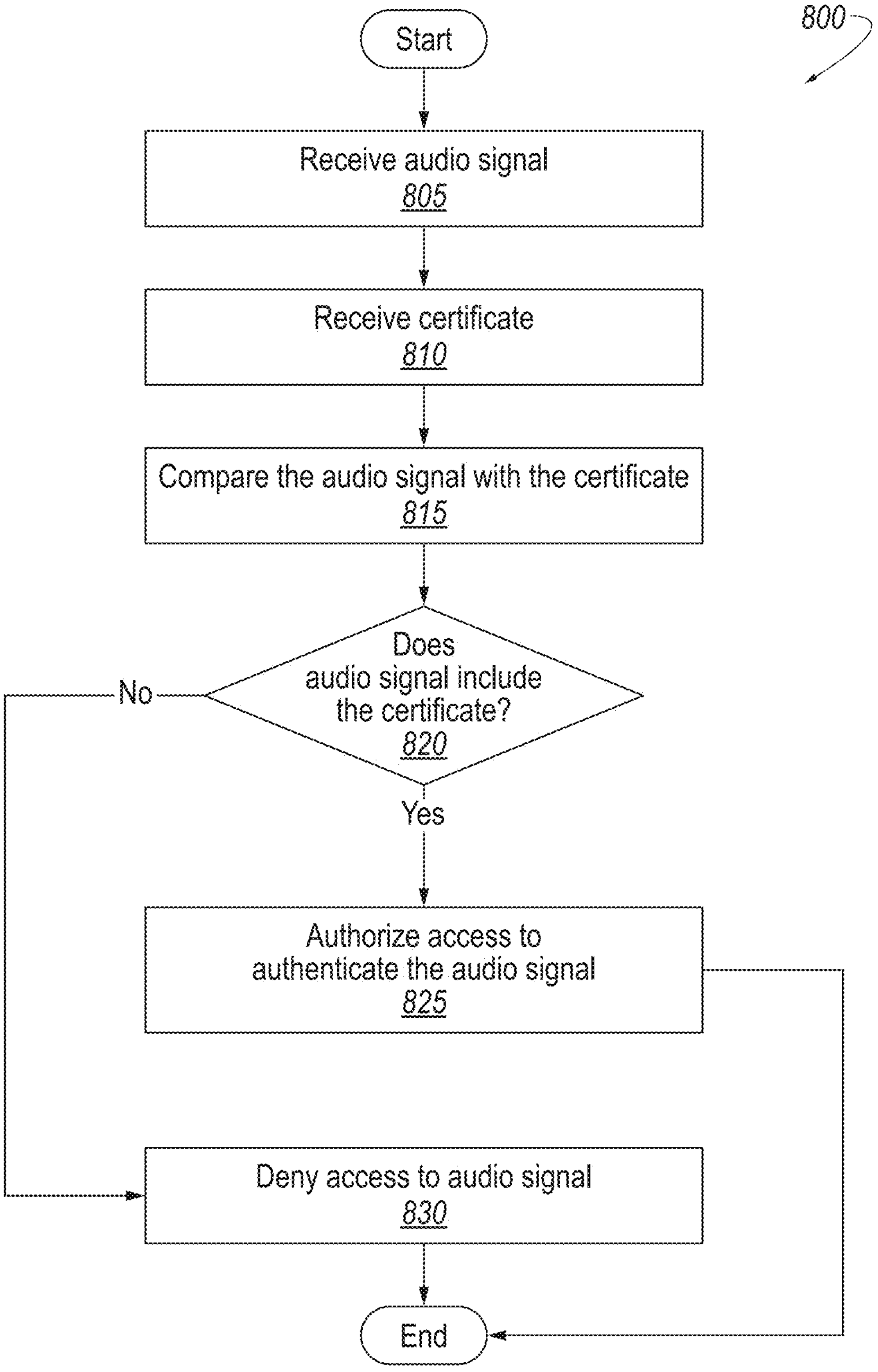
FIG. 8 illustrates an example decoding process for the watermark system of FIG. 1.

FIG. 8 illustrates an example decoding process 800 for the watermark system 100. The process 800 may begin at block 805 where the decoder 122, as illustrated in FIG. 1, receives the audio signal. The audio signal may include human speech. The human speech may be that of an important political figure, celebrity, etc., and spoofing such a voice with a voice avatar could create widespread issues. While the specific use case of a human recording is used herein as an example, it is to be understood that decoding may apply to any and all watermarking examples. For example, the audio signal may include the recording of a synthetic voice recording or human speech.

At block 810, the decoder 122 may receive the certificate or watermark signal. At block 815, the decoder may compare the audio signal with the certificate.

At block 820, the decoder 122 may determine whether the audio signal includes the encoded watermark signal. This may be done by comparing the certificate 118 with the audio signal to see if the audio signal includes the certificate. If the decoder 122 determines that the encoded watermark signal is present in the audio signal, the process 800 proceeds to block 825. If not, the process 800 proceeds to block 830.

At block 825, the decoder 122 may authorize access to authenticate the audio signal based on the presence of the watermark signal. This may allow the audio signal to be transmitted, played, etc.

At block 830, in the absence of a watermark signal or in case unauthorized use of a watermarked voice signal, the decoder 122 may deny access or authentication and may transmit messages or instructions indicating the unauthorized use of the audio signal.

The process 800 may then end.

While the methods refer to audio signals, it is to be understood that other content and signals may benefit from the watermark application 100 and the processes described herein. For example, the processes may be applied to pictorial signals such as video signals to prevent against fake videos. The watermark may be applied to the image data within a video stream, though the audio content of the video may also benefit from watermarking at the same time. Further, in the example of a synthetic voice recording or human speech, the receiver may receive the message, e.g., a TTS voice sample, a clone voice, a human voice recording, a video, etc. The watermark may be used to verify that such a recording is authentic or validated. In this example, the decoder 112 may determine whether the audio signal includes a watermark and if so, may extract the watermark. The decoder may then validate the watermark. This may be done in one of several ways. First, the system may present the content of the watermark to the user (e.g., type of audio: human recording, clone voice, etc.; word sequence that the audio should produce, identity of the speaker, date of the recording, certificate/encrypted token, etc.). The user may then determine whether this watermark is valid.

Second, the decoder may determine whether the certificate and/or tokens of the sender are valid/match. Third, automatic speech recognition may be used to automatically check whether the spoken words in the audio file match the word sequence that is part of the watermark.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (erasable programmable read-only memory (EPROM) or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for applying a watermark signal to a speech signal to prevent unauthorized use of speech signals, the method comprising:
- receiving an original speech signal;
- determining a corresponding spectrogram of the original speech signal;
- selecting a phase sequence of fixed frame length and uniform distribution;
- determining a frequency dependent gain factor based at least in part on a frequency of the original speech signal, wherein the frequency dependent gain factor is based on at least one frequency threshold, where a first gain factor is selected for frequencies below a first threshold frequency, and where a second gain factor is selected for frequencies above a second threshold frequency; and
- generating an encoded watermark signal based on the corresponding spectrogram and phase sequence.

2. The method of claim 1, further comprising taking the magnitude of the original speech spectrogram to generate the encoded watermark.

3. The method of claim 1, wherein the spectrogram is determined by applying a short-time Fourier transform (STFT) to determine the sinusoidal frequency and phase content of each frame of the original input signal.

4. The method of claim 1, further comprising applying bit encoding prior to generating the encoded watermark.

5. The method of claim 4, wherein the bit encoding includes assigning bits based on information about the original speech signal.

6. The method of claim 5, wherein the bit encoding is spread out through a subset of frequency bins to allow for detection of the bit encoding in adverse conditions.

7. The method of claim 1, where a transition gain factor is selected for frequencies between the first threshold frequency and the second threshold frequency.

8. The method of claim 1, further comprising storing the encoded watermark for authenticating a future speech signal, the encoded watermark defining permissions for use of the future speech signal.

9. The method of claim 1, further comprising adding at least one of a pretty good privacy (PGP) or public key cryptography to the watermark signal.

10. The method of claim 1, wherein the watermark signal includes words spoken in the original speech signal, wherein each word is associated with a sequence position.

11. The method of claim 10, wherein the watermark signal includes a start and end time for each word as spoken in the original speech signal.

12. A non-transitory computer readable medium comprising instructions for applying a watermark signal to a speech signal to prevent unauthorized use of speech signals that, when executed by a processor, causes the processor to perform operations comprising to:
- receive an original speech signal;
- determine a corresponding spectrogram of the original speech signal;
- select a phase sequence of fixed frame length and uniform distribution;
- generate an encoded watermark signal based on the corresponding spectrogram and phase sequence, wherein the watermark signal includes words spoken in the original speech signal, wherein each word is associated with a sequence position.

13. The computer program product of claim 12, where the processor to perform operations further comprising to take the magnitude of the spectrogram to generate the encoded watermark.

14. The computer program product of claim 12, wherein the spectrogram is determined by applying a short-time Fourier transform (STFT) to determine the sinusoidal frequency and phase content of each frame of the original input signal.

15. The computer program product of claim 12, where the processor to perform operations further comprising to apply bit encoding prior to generating the encoded watermark.

16. The computer program product of claim 15, wherein the bit encoding includes assigning bits based on information about the original speech signal.

17. A method for applying a watermark signal to an audio signal including speech content to prevent unauthorized use of the speech content, the method comprising:
- receiving an original audio signal having speech content;
- generating an encoded watermark signal based on the original speech signal and a frequency dependent gain factor based at least in part on a frequency of the original speech signal, wherein the frequency dependent gain factor is based on at least one frequency threshold, where a first gain factor is selected for frequencies below a first threshold frequency, and where a second gain factor is selected for frequencies above a second threshold frequency, the encoded watermark signal defining allowed usage of the original audio signal; and
- transmitting an encoded audio signal including the original audio signal and watermark signal.

* * * * *